United States Patent Office 3,632,800
Patented Jan. 4, 1972

3,632,800
OLEFIN POLYMERIZATION
William S. Anderson, Oakland, Calif., assignor to
Shell Oil Company, New York, N.Y.
No Drawing. Filed Nov. 27, 1968, Ser. No. 779,588
Int. Cl. C08f 1/62, 3/06
U.S. Cl. 260—94.9 R                1 Claim

ABSTRACT OF THE DISCLOSURE

Novel, essentially linear alpha-omega dihydroxyalkanes of 1,000 to 15,000 number average molecular weight are produced by reacting ethylene in aqueous solution of a highly dissociated silver salt, containing a dialkyl peroxydicarbonate as free-radical generating reaction initiator, separating the solid reaction product and hydrolyzing it. The dihydroxyalkanes can be converted to a variety of products by reactions of the terminal hydroxyl groups with reagents, such as diisocyanates, thionyl chloride, phosgene, adipoyl chloride and dimethyldichlorosilane. These conversion reactions can be applied to utilize the dihydroxyalkanes as castable resins in the production of shaped articles of polyethylene-like polymers.

BACKGROUND OF THE INVENTION

This invention relates to essentially linear alpha-omega dihydroxylalkanes in the 1,000 to about 15,000 molecular weight range, and to methods of preparing such products and derivatives thereof.

Some linear aliphatic compounds having terminal hydroxyl groups are known commercial compounds, e.g., the alpha-omega diols of butane, hexane and decane and unsaturated diols of high molecular weight polybutadiene. The novel compounds of this invention differ from these known diols in being solid, relatively crystalline, saturated products, capable of different uses, e.g., in the production of various polymers.

Methods for producing the known alpha-omega diols are not useful or practical for producing alpha-omega diols of essentially linear alkanes in the 1,000 to 15,000 molecular weight range; the present invention provides a method for producing the latter compounds.

The method of this invention is a modification of a method described by Bier et al. in "Angewandte Chemie," vol. 74, 1962, pp. 977–984, for the free-radical promoted production of polyethylene from ethylene at low pressure. In the method of Bier et al., ethylene is polymerized to high molecular weight polyethylene by polymerization at temperatures between 20° and 80° C. in an aqueous system containing a silver salt as complexing agent, together with a free-radical initiator.

SUMMARY OF THE INVENTION

This invention provides novel alpha-omega dihydroxyalkanes which are characterized by an essentially linear structure and a number average molecular weight in the range between 1,000 and about 15,000.

The invention also provides a method for producing such compounds. The method comprises reacting ethylene in an aqueous solution of a highly dissociated silver salt, preferably silver perchlorate, containing as free-radical initiator a dialkyl peroxydicarbonate having one to three carbon atoms per alkyl group; separating the resulting solid reaction product from the reaction mixture; hydrolyzing the separated reaction product under an inert atmosphere; and recovering the resulting dihydroxyalkane.

The invention further provides methods for producing useful polymers such as polyurethanes, polycarbonates, and polysiloxanes from the dihydroxyalkanes of the invention, and for converting the dihydroxyalkanes to crosslinked polymers.

DESCRIPTION OF THE PREFERRED EMBODIMENT

The ethylene reaction of the invention is carried out in the presence of a silver salt. The salt must be one which is highly dissociated in aqueous solution. Suitable silver salts include, for example, silver perchlorate, silver fluoborate, silver fluosilicate, silver fluophosphate, silver fluoantimonate, silver fluorosulfate, silver nitrate, silver dialkyl-phosphates, silver perfluorocarboxylates, such as silver trifluoroacetate and the like, and mixtures of these salts. Silver perchlorate is preferred because of its catalytic activity and availability.

The amount of silver salt catalyst utilized depends somewhat on the reaction conditions and the product desired. Generally, the higher the concentration of silver salts, the faster the reaction and the higher the molecular weight of the product. The concentration of aqueous silver salt in the reaction solution may be between 10 and 85% by weight. However, aqueous salt solutions of about 20 to 40% by weight are preferred.

A small amount of dialkyl peroxydicarbonate having one to three carbon atoms per alkyl group is present in the reaction mixture. These compounds act as initiators which will generate free radicals at the low reaction temperatures without generating free oxygen. These initiators include diisopropyl, diethyl and dimethyl peroxydicarbonate. The diisopropyl compound is the most stable of the three, but results in relatively low reaction rates. The dimethyl compound is the most effective but is less stable and must be handled with caution. The amount of initiator used may be between about 2 and 20% by weight of the total reaction mixture.

Relatively low pressure and temperatures are utilized throughout the reaction. Pressures may be between about 10 and 1,000 p.s.i.g. and preferably between about 50 and 500 p.s.i.g. Temperatures are between about 0° and about 20° C.

The conversion of ethylene is suitably carried out as a batch method. In a preferred embodiment a stainless steel vessel, provided with an agitator, is charged with an aqueous solution of the silver salts. Means are provided for purging the solution and vessel of all residual oxygen. The solution is brought to the desired reaction temperature, initiator is added and ethylene is then charged to the vessel. In a batch process, ethylene addition may be continuous or intermittent. The reaction product will separate as fine particles of solid which can be separated from the aqueous reaction mixture by filtration, centrifugation, and the like. The separated solid product is washed to remove adhering reaction solution and can be dried by suitable means.

The product recovered from this reaction will contain some hydroxyl end groups and some carbonate end groups. In order to produce the alpha-omega dihydroxyl compounds, these reaction products are hydrolyzed in an inert atmosphere. Hydrolysis may be carried out by suitable known methods for reacting the polymerization reaction product with an alkali metal hydrroxide, preferably KOH. One such method is illustrated in the examples.

In working up the reaction product, it is desirable to remove all residual silver. 99% of the silver can be extracted with three water washes under strong agitation, such as in a Waring blendor. Saponification of the initial reaction product with potassium hydroxide removes the remaining silver perchlorate a silver metal.

In an alternative method, the reaction product may be dissolved in hydrocarbon at 100° C. and freed of silver perchlorate by extracting such solution with boiling water.

It was found that the use of relatively low amounts of initiator, use of relatively low residence time in the reactor and immediate product recovery are desirable for preventing the precipiation of silver as metallic silver in the initial reaction product.

The predominant components of the products of this invention are nearly linear alkanes, typically having an average of no more than 10 methyl group branches per thousand carbon atoms and having hydroxyl groups on the two terminal carbon atoms. The products have a very low residual unsaturation. The upper limits of unsaturation, determined by infrared methods on a number of representative products, range from 0.02 to 0.1 vinyl unit, from 0.02 to 0.1 transvinylene and from 0.07 to 0.1 vinylidene unit per chain. The total unsaturation is thus less than 0.3 double bonds per chain.

The density of products of this invention is typically in the range from 0.94 to 0.97 g./ml. They are soluble in aliphatic, aromatic and chlorinated hydrocarbon solvents.

The dihydroxyalkanes of this invention have a very low degree of long-chain branching, as indicated by a narrow ratio of weight average molecular weight to number average molecular weight, the ratio typically being between 2.0 and 3.0. No gelling is observed in the product.

The melting points of the dihydroxyalkanes of this invention are typically in the range from 100° to 133° C.

In spite of the high densities and high melting points, the products of this invention are not free of methyl groups. The products typically have no more than ten, and generally only 3 to 6 methyl groups per thouasnd carbon atoms. This is lower by an order of magnitude than the methyl group content of conventional free-radical produced polyethylene.

Agitation is continued and ethylene is sparged into the reaction liquid. The stirrer is typically operated at 600–800 r.p.m. Ethylene is added to the reaction mixture periodically after each drop of 50–100 p.s.i. from the original pressure. Conversion is stopped by venting the residual ethylene. The autoclave is then opened and product removed as a fluff or cake. The product is separated from the aqueous solution by filtration, washed three times in a Waring Blendor and vacuum dried at 50° C. to give a powder of bulk density of about 0.1 g./ml.

Hydrolysis

The hydrolysis reagent is a mixture of xylene, buantol, water, and potassium hydroxide; this is a modification of the reagent as suggested by Richfield et al., Anal. Chem. 33, 1834 (1961). Xylene concentration is increased where required to bring the product into solution. The product is maintained in the hydrolysis mixture at reflux condition. In six hours of refluxing, 95% of the carbonyl group of a typical product are hydrolyzed. In the hydrolysis, silver remaining with the washed product is precipitated during the refluxing in 97% yield as large, easily filterable particles. Silver content of the samples after hydrolysis was below the level detectable by neutron activation, i.e., below 40 p.p.m.

In an alternative method, sodium methoxide in refluxing xylene also hydrolyses the product, but this does not result in clean precipitation of silver. It appears that water is necessary for the reduction step.

After hydrolysis, the product may be reprecipitated two to three 20 times in acetone to free it from the hydrolysis mixture.

The conditions and results of representative reactions carried out as described are given in Table I.

TABLE I

| Run | Initiator | Silver perchlorate | | | Temperature, °C. | Pressure, p.s.i.g. | Reaction time, hour | Yield, gram | Melting point, °C.[d] | Molecular weight (ebullioscopic) | Intrinsic viscosity, dl./g.[e] | Density, gram/ml.[f] |
|---|---|---|---|---|---|---|---|---|---|---|---|---|
| | | Weight, initiator, gram | Weight, percent | Grams of solution | | | | | | | | |
| A | i-Pr [a] | 2.2 | 30 | 500 | 30–38 | 750–850 | 23 | 92 | 128 | 16,000±3,000 | 0.93 | 0.948 |
| B | Et [b] | 2.2 | 20 | 500 | 26–34 | 280–300 | 6.5 | 6.6 | 123 | 3,300±200 | 0.23 | 0.961 |
| C | Et | 0.79 | 20 | 59 | 10 | 78–105 | 6 | 0.55 | 121 | 3,300±500 | | |
| D | Me [c] | 1.1 | 30 | 500 | 12–19 | 270–325 | 6 | 40.2 | 128 | | 1.2 | 0.966 |
| E | Et | 4.8 | 30 | 500 | 8–13 | 240–315 | 6 | 13.5 | 128 | 3,200±160 | 0.45 | 0.965 |
| F | Et | 0.1 | 50 | 60 | 0 | 75–105 | 6 | 2.3 | 133 | 15,000±2,500 | 1.9 | 0.933 |
| G | i-Pr | 2.2 | 20 | 500 | 18–22 | 290–310 | 48 | 32.5 | 125 | 16,000±2,000 | 0.76 | 0.960 |
| H | Me | 2.2 | 20 | 500 | 11–14 | 273–295 | 6 | 19.5 | 113 | 9,400±600 | | 0.962 |

[a] Diisopropyl peroxydicarbonate.
[b] Diethyl peroxydicarbonate.
[c] Dimethyl peroxydicarbonate.
[d] DTA peak on quenched samples. Hearing rate 30° C./minute.
[e] In decalin, 150° C.
[f] Precipitated in acetone, not annealed.

The following examples are provided to better illustrate the manner in which the invention is carried out. The examples are for the purpose of illustration and the invention is not to be regarded as limited thereto. Unless otherwise specified, parts and percentages in the specification and examples are given by weight.

EXAMPLE I

Initial reaction

A one liter stainless steel autoclave equipped with an agitator and internal cooling coil is purged with nitrogen and charged with 500 grams of a 30% silver perchlorate solution. The solution is heated from 70 to 80° C. and purged several times with nitrogen at 200–500 p.s.i.g. The solution is then cooled to a reaction temperature in the range from 0 to 20° C. An initiator, e.g., diisopropyl peroxydicarbonate, is then added to the reaction solution and the reaction mixture purged several times with ethylene.

EXAMPLE II

Alpha-omega dihydroxyalkanes produced according to this invention can be converted into a variety of other chemical compounds by means of reactions typical of primary alcohols.

The formation of trityl ether, in particular, is characteristic of primary OH in polymers and is one way of establishing that the OH groups in question are terminal. The hydroxyl groups can be converted to other functional groups by coupling in hot hydrocarbon solution with an excess of bifunctional molecule, e.g., a diisocyanate, phosgene, dicarboxylic acid dichloride, thionyl chloride, epichlorohydrin, 2,2-bis(2,3-epoxypropoxyphenyl)propane or dichlorosilane. Owing to the transparency of the dihydroxyalkane through most of the infrared, the changes in functional group structure are easily observed.

Representative reactions and reaction products are shown in Table II. The conditions for carrying out the reactions of Table II will be known to organic chemists, so that it is not necessary to describe them here in detail.

TABLE II

| Reagent | Product | Identifying bands |
|---|---|---|
| Phenyl isocyanate, pyridine. | Phenylurethane | 3.0, 5.75, 6.25, 6.6 7.65, 8.3μ; $\lambda_{max.}$ =274 mμ. |
| Toluene diisocyanate, pyridine. | Isocyanate-terminated polymer. | 4.4μ. |
| Toluene diisocyanate, pyridine, then triethylene glycol (TEG). | TEG-urethane terminated polymer. | 3.0, 5.75, 6.25μ, no. 4.4μ. |
| Thionyl chloride | Chlorosulfite | 8.2, 8.4μ. |
| Phosphorus oxychloride | Phosphate | 4.15, 4.35, 8.3, 9.7μ. |
| Phosgene, pyridine | Chloroformate | 5.62μ. |
| Phosgene, pyridine, then IPA. | Isopropyl carbonate | 5.73μ. |
| Trityl chloride | Trityl ether | 11.15, 13.0, 13.2 14.25μ. |
| Adipoly chloride, pyridine, then water. | Hydrogen adipate | 2.95, 5.70, 5.80, 3.95, 4.05μ. |
| Triphenylphosphine plus bromine. | Bromine | 15.35μ. |
| Acetic anhydride, pyridine. | Acetate | 5.73, 8.07μ. |
| Dimethyldichlorosilane | Dimethylchlorosiloxane. | 7.95, 9.3, 9.8, 12.5, 21.5μ. |

Several of the conversion products shown in Table II are useful in the production of various polymers. For example, the isocyanate-terminated product is useful as the diisocyanate component of a polyurethane. The chloroformate is useful for conversion to a polycarbonate by reaction with diols, including the dihydroxyalkanes of this invention. The hydrogen adipate is useful as reactant for production of polyesters. The dimethylchlorosiloxane is a useful intermediate for the production of silicone polymers.

The diglycidyl ether, which can be prepared by known methods, is useful for conversion to epoxy resins by reaction with known curing agents.

EXAMPLE III

The conversion of a dihydroxyalkane of this invention into a diisocyanate is carried out as follows:

A sample of the dihydroxyalkane is dissolved in hot xylene. A ten-fold stoichiometric excess of toluene diisocyanate is added to the solution which is then held at 100° C. for half an hour without stirring. The solution is then poured into acetone at room temperature, which causes a solid product to precipitate. The solid product is recovered and redissolved in xylene, and again precipitated in acetone. The product is dried under vacuum, while preventing exposure to air. Infrared analysis of the product shows that the hydroxy end groups have been converted to isocyanate groups connected through a urethane linkage.

The diisocyanate product of this reaction can be converted to polyurethane polymer, if desired, by reaction with polyhydroxy compounds in known manner. The polyhydroxy compound used in this conversion may be a dihydroxyalkane produced according to this invention.

EXAMPLE IV

Treatment of dihydroxyalkanes of this invention with a polyfunctional reagent results in a cross-linking to produce a gelled product. For example, a slow addition of excess silicon tetrachloride to a solution of the dihydroxyalkane in xylene results in precipitation of gelled product having silicate cross-links.

Allophanate cross-linking can be obtained by reacting dihydroxyalkanes in dilute xylene solution at 100° C. with toluene diisocyanate present in approximately stoichiometric ratio.

EXAMPLE V

In order to demonstrate the condensability of dihydroxyalkanes of this invention, the following was done: A sample of product of Run E of Table I was dissolved at reflux in dry n-octane containing 10 percent by weight pyridine; phosgene was bubbled through this solution for 10–15 minutes. This treatment converted the hydroxyl end groups to chloroformate. The mixture was then stripped of excess phosgene by purging with nitrogen. Pyridine and a second, identical charge of dihydroxyalkane were then added. The ebullioscopically determined molecular weight was found to have been increased from 3,200±160 to 20,000±4,000.

The infrared spectrum of the product showed that the chloroformate groups (5.63 microns) had been converted to carbonate groups (5.72 microns). The dihydroxyalkane has thus been condensed to a polycarbonate having about six times the initial molecular weight. Infrared showed the presence of unconverted hydroxyl groups; the polymer was functionally capable of condensing to still higher molecular weight. 1,10-decanediol, when coupled as above, condensed to a gummy polycarbonate with a similar spectrum.

The dihydroxyalkanes of this invention can be used as "castable resins." Objects too large or too intricate to mold practically from conventional polyethylene may be cast from the dihydroxyalkane combined with a stoichiometric amount of condensing agent such as diisocyanate, bis-(chloroformate), or dichlorosilane. A six-fold increase in molecular weight is sufficient to convert the product from a friable, free-flowing waxy material (3,200 molecular weight) to a tough plastic.

I claim as my invention:

1. Slightly methyl-branched essentially linear alpha-omega-dihydroxyalkane having a number average molecular weight in the range from 1,000 to about 15,000, 3 to 10 methyl groups per thousand carbon atoms, a melting point of 100 to 133° C., and a maximum unsaturation of 0.3 double bond per chain.

References Cited

UNITED STATES PATENTS 3,472,826   10/1969   Potts et al.   260—88.2

FOREIGN PATENTS 942,265   11/1963   Great Britain.

OTHER REFERENCES

Bier et al., Angew. Chem., vol. 74, 1962, pp. 977–984.

JOSEPH L. SCHOFER, Primary Examiner

E. J. SMITH, Assistant Examiner

U.S. Cl. X.R.

260—2, 77.5, 94.9 A, 94.9 G, 635 R.